May 19, 1936.　　R. A. BRADLEY ET AL　　2,041,320
TANK VEHICLE
Filed Oct. 9, 1933　　3 Sheets-Sheet 1
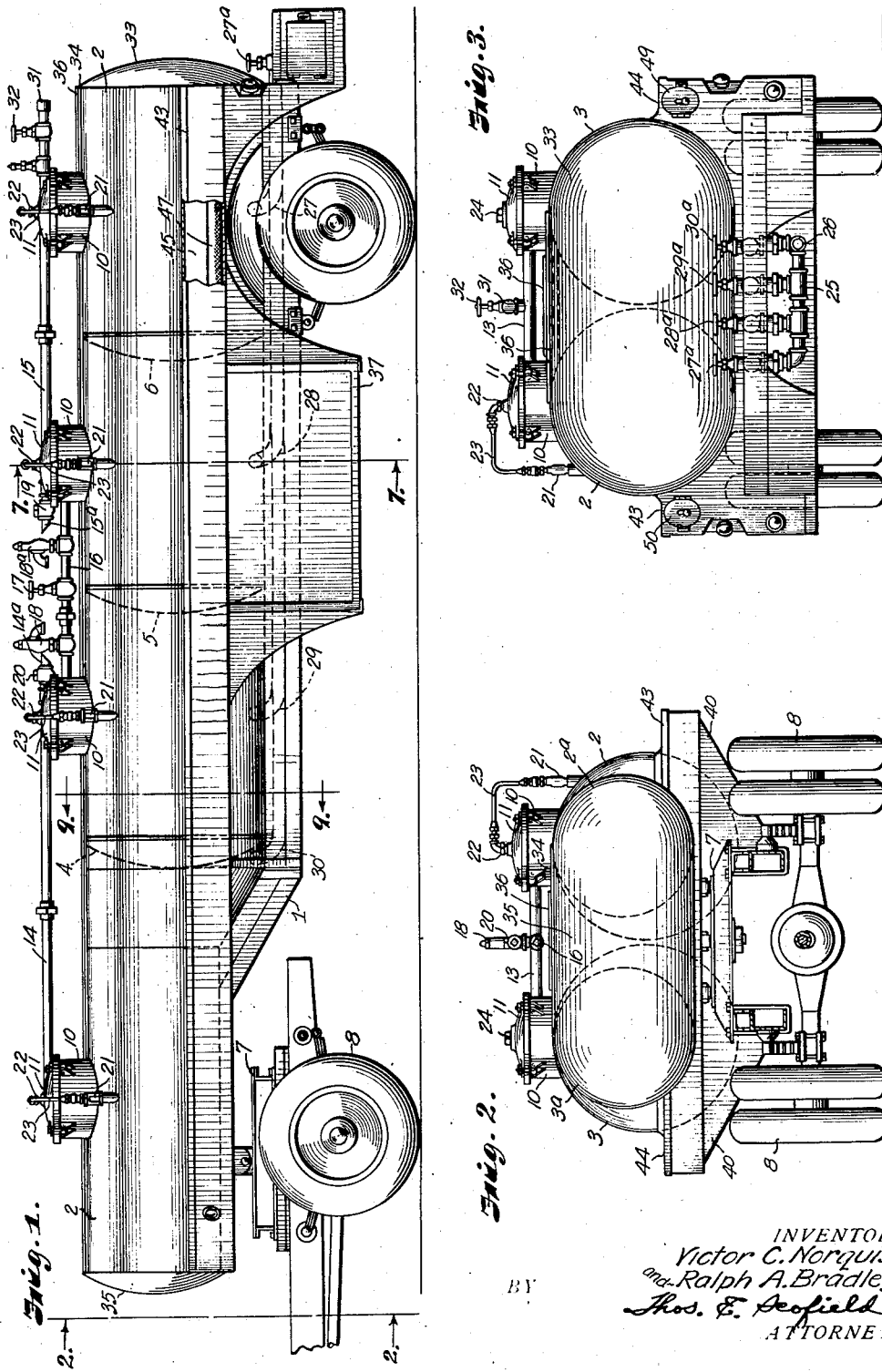
INVENTORS
Victor C. Norquist
and Ralph A. Bradley
BY Thos. E. Scofield
ATTORNEY

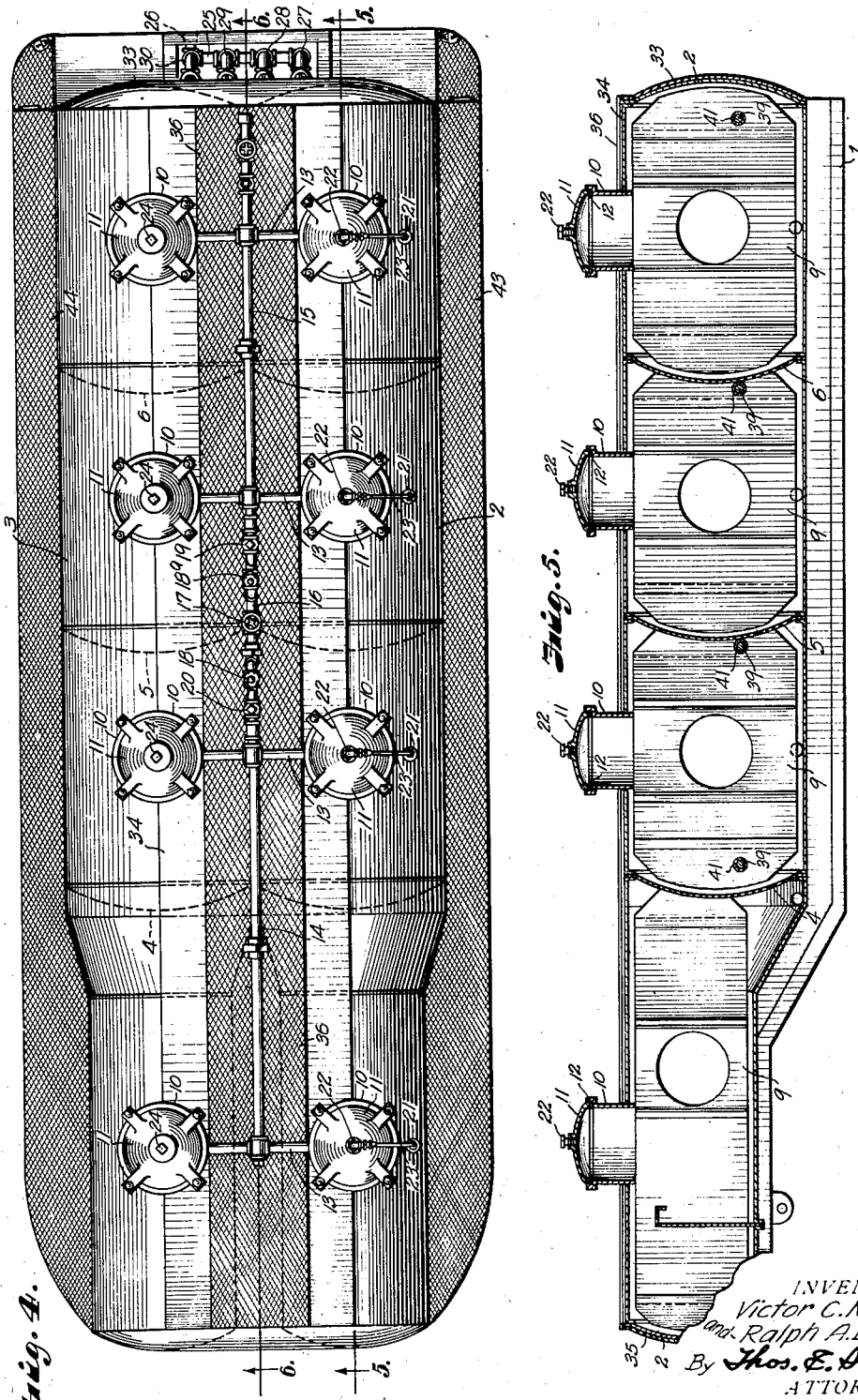

May 19, 1936. R. A. BRADLEY ET AL 2,041,320
TANK VEHICLE
Filed Oct. 9, 1933 3 Sheets-Sheet 3
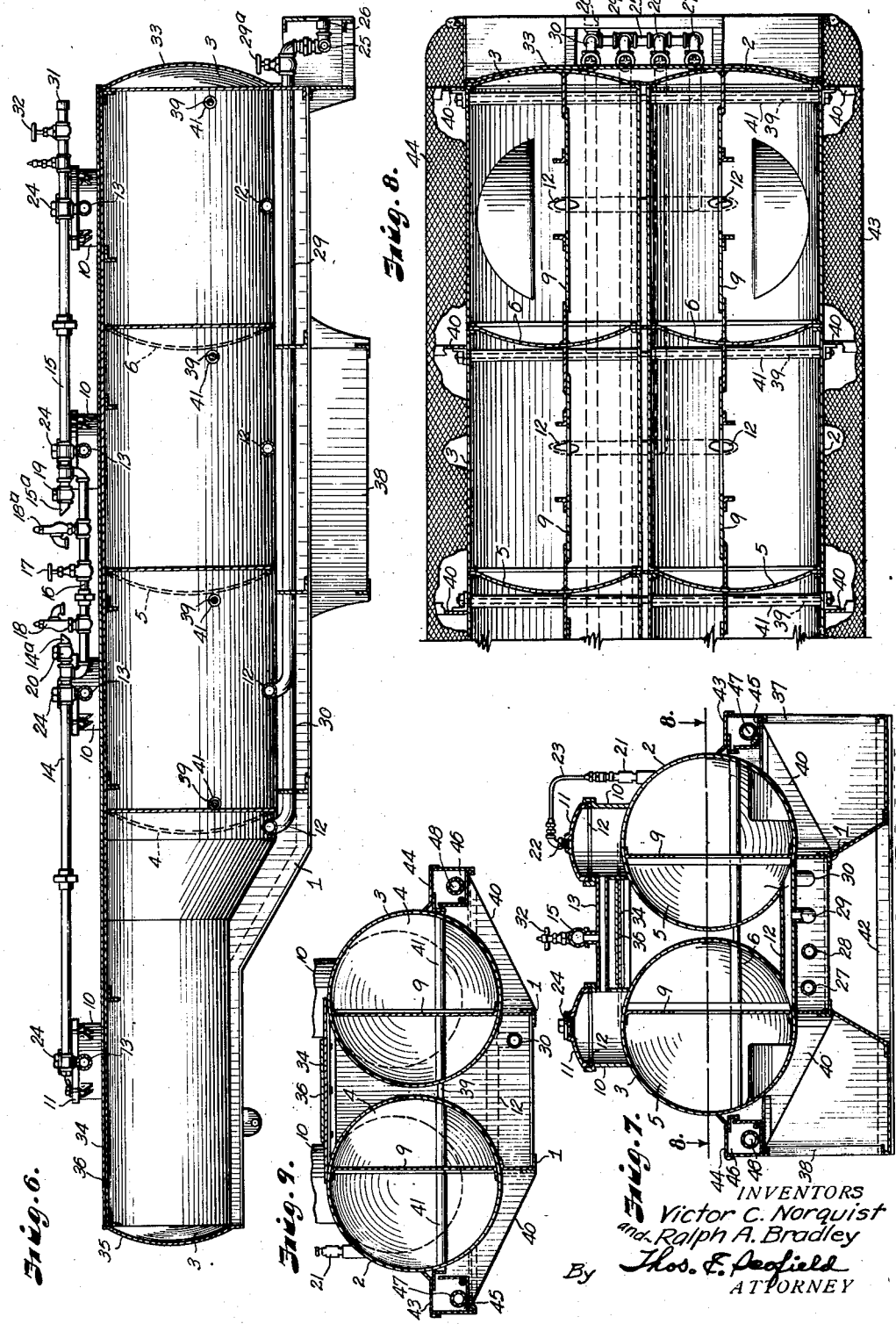
INVENTORS
Victor C. Norquist
and Ralph A. Bradley
By Thos. E. Scofield
ATTORNEY Patented May 19, 1936

2,041,320

UNITED STATES PATENT OFFICE 2,041,320

TANK VEHICLE

Ralph A. Bradley and Victor C. Norquist, Kansas City, Mo., assignors to Butler Manufacturing Company, Kansas City, Mo., a corporation of Missouri Application October 9, 1933, Serial No. 692,782

3 Claims. (Cl. 280—5)

Our invention relates to tank vehicles and more particularly to a tank vehicle of the trailer type and adapted to withstand high pressure.

This application is a continuation in part of our co-pending application for Tank vehicles, Serial No. 675,766, filed June 14, 1933.

Casinghead gasoline is a very volatile and extremely light gasoline containing butane, butylene, ethane, ethylene, some propane and propylene, and some heavier hydrocarbon fractions. The lighter hydrocarbon fractions above mentioned are extremely volatile so that, at a temperature of 100° F. the vapor pressure of casinghead gasoline will be as high as 25 pounds per square inch. At slightly higher temperatures, the rise in vapor pressure is extremely rapid. Trailer tank vehicles have been made having a cross sectional shape of an oval or an ellipse in order to produce a vehicle having a low center of gravity. If a tank were made with an oval or ovate cross section and sufficiently strong to withstand a vapor pressure of 25 pounds per square inch with sufficient safety, the heavier sheets of steel which would be necessary and stay bolts which would be used in the region of the portions of less curvature, would add a considerably increased amount of dead weight. The added weight is an important item in a vehicle. The construction, furthermore, would be considerably more expensive due to the heavier weight of the metal and the labor and material used when using stay bolts.

One object of our invention is to provide a tank vehicle preferably of the trailer type, which will be able to stand high vapor pressures and thus be used to transport casinghead gasoline, having the following advantages:

a. A low center of gravity.
 b. Substantially the same capacity as a tank of an ovate cross section.
 c. A high factor of safety.

Further and other objects of our invention will appear from the following description.

In general our invention contemplates the provision of a plurality, preferably two, tanks having a cylindrical cross section and placed side by side on a suitable chassis. It will be observed that, due to the fact that a cylindrical cross section is used, that a balanced shell load will result upon pressure without the necessity of using stay bolts as it is a well known engineering fact that a cylindrical or circular shape is the strongest for distributing stresses for a given weight of material. The use of a single cylindrical tank however would result in a vehicle with a high center of gravity. By using a pair of cylindrical tanks, the center of gravity is lowered and the capacity of substantially the same as if a tank having an ovate cross section were used.

In the accompanying drawings which form part of the instant specification and which are to be read in conjunction therewith, and in which like reference numerals are used to indicate like parts in the various views:

Figure 1 is a side elevation of a trailer tank vehicle embodying one mode of carrying out our invention.

Figure 2 is an end view of the trailer tank vehicle shown in Figure 1 taken along the line 2—2 of Figure 1.

Figure 3 is a view of the rear of the vehicle shown in Figure 1.

Figure 4 is a plan view of the vehicle shown in Figure 1.

Figure 5 is a sectional elevation taken along the line 5—5 of Figure 4.

Figure 6 is a sectional elevation taken along the line 6—6 of Figure 4.

Figure 7 is a sectional view taken along the line 7—7 of Figure 1.

Figure 8 is a sectional view taken along the line 8—8 of Figure 7.

Figure 9 is a sectional view taken along the line 9—9 of Figure 1.

More particularly referring to the drawings, a chassis frame 1 of any suitable construction supports our tank construction. This invention is concerned chiefly with the tank construction and it is to be remembered that the strengthening features of the construction are being claimed in our copending application, Ser. No. 675,766. A pair of cylindrical tanks 2 and 3 are mounted on the chassis 1. The tanks are divided into four compartments by means of respective partitions 4, 5, and 6 as can readily be seen by reference to Figure 5. The forward ends of the tanks are formed by cylindrical portions 2ª and 3ª, which are smaller in diameter than the main tank portions, in order to permit the employment of a fifth wheel construction 7 resulting in a tank having a low center of gravity. The fifth wheel construction is supported by a towing vehicle having wheels 8 as can be seen by reference to Figure 2. Longitudinal plates 9 extend between the respective partitions within the compartments. These plates can be readily seen by reference to Figure 5 and possess many advantages more fully pointed out in our copending application. Each of the compartments formed by the partitions is provided with a manhole 10 fitted with a cover 11 which seats upon a suitable gasket 12 in order to give a gas tight joint.

Respective compartments in the tanks are connected by a pipe 12' so that the amount of fluid in each compartment will be the same. To equalize vapor pressure, the respective tanks are connected by means of lines 13 above the liquid level as can readily be seen by reference to Figure 4. Lines 13 are connected in groups by longitudinal pipes 14 and 15 which, in turn, are interconnected by means of pipe 16 which is provided with a valve 17 so that the forward group comprising four compartments may be isolated from the after group comprising four compartments. Each group is provided with a safety valve 18 and 18a to lines 15 and 14 respectively. The safety valves are set for a maximum pressure, as for example 30 or 35 pounds. When the tank is emptied or any compartment thereof be emptied, air may be drawn through open end 15a of line 15 or open end 14a of line 14, through respective check valves 19 and 20. It will be understood, of course, that the air inlets 14a and 15a are provided with suitable fire screens which may be placed also inboard of safety valves 17 and 18. Sight level gauges 21 are provided for each group of compartments and fitted as shown in Figures 1 and 7. The tops of one set of manhole covers 11 are fitted with plugs 22 to which are connected lines 23 leading to the sight gauges 21. The manhole covers of the other tank are fitted with removable plugs 24 as can readily be seen by reference to Figure 7. These plugs may be used for filling the respective compartments if desired. In handling casinghead gasoline, however, filling a tank through the top thereof entails a considerable loss of gasoline due to the evaporation of light ends. For example, it has been found that filling a 2000 gallon tank through the top will result in a loss of 225 gallons of gasoline, due to weathering and evaporation losses in handling. This not only results in the loss of gasoline but the gases evaporated present a distinct and dangerous fire and explosion hazard. Accordingly, we propose to fill the tank through the bottom thereof by means of the manifold 25 shown in Figure 3. The filling hose is coupled to fitting 26. A series of pipes 27, 28, 29, and 30 controlled by valves 27a, 28a, 29a, and 30a lead to respective cross connections 12 of the tanks. It will be readily appreciated by manipulating valves 27a, 28a, 29a, and 30a that any desired number of compartments may be filled at will.

When filling from a bulk tank, cap 31 which is found at the end of line 15, is removed. A vent hose is secured to line 15 and is led to the bulk tank near the top thereof. Valve 32 is opened. It will readily be seen that as the gasoline enters any of the compartments being filled, valves 17 and 32 being opened, gases and vapors from the tank will be allowed to return to the bulk tank where they may condense so that the gasoline is not lost and, further, a fire hazard is avoided.

In order to give the appearance of a single tank of ovate cross section to the construction, sheathing is placed at the ends and top of the pair of tanks. This can be readily seen by reference to Figure 4. Under sheathing 33 covers the rear end. Sheathing 34 covers the top of the space between tanks and sheathing 35 covers the front end of the tanks. A runway 36, which may be diamond treaded as shown, is placed on top of sheathing 34. Barrel carriers 37 and 38 are fitted, suspended by means of rods 39 and brackets 40 as disclosed in our above mentioned, copending application. The rods 39 are housed in suitable tubes 41. Compressional rods 42 extend between the barrel carriers 37 and 38 as shown in Figure 7. Running boards 43 and 44 are provided at the sides of the respective tanks as shown. Compartments 45 and 46, adapted to house hose 47 and 48 are fitted, the hose being removed from the rear end of the longitudinal compartments 45 and 46 through doors 49 and 50.

It is believed that the operation of our tank vehicle will be understood from the foregoing description. It will be seen, furthermore, that we have accomplished the objects of our invention. We are enabled to produce a tank vehicle construction in which the advantages of using a tank, cylindrical in cross section, are combined with the advantages of using a tank having an ovate cross section, in that a low center of gravity is obtained with a high pressure retaining capacity, with a lighter construction than would be the case if a cylindrical cross section were not employed for the tank. By cross connecting compartments, the vehicle is always balanced. Any individual group of compartments may be filled or emptied at will by means of the manifold filling connections described.

It will be understood that certain features and sub-combinations are of utility and may be employed without reference to other features and sub-combinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A tank vehicle comprising in combination a pair of cylindrical tanks, partitions in said tanks dividing the same into compartments, pipes communicating with the bottom portions of respective compartments for equalizing the liquid levels therein, ducts communicating with respective compartments above the liquid levels in said tanks for equalizing the vapor pressures therein, and a duct providing communication between said communicating ducts.

2. A tank vehicle comprising in combination a pair of cylindrical tanks having reduced forward end portions, partitions in said tanks dividing the same into compartments, pipes communicating with the bottom portions of respective compartments for equalizing the liquid levels therein, ducts communicating with respective compartments above the liquid levels in said tanks for equalizing the vapor pressures therein, and a duct providing communication between said communicating ducts.

3. A trailer tank vehicle comprising in combination, a pair of cylindrical tanks adapted to be supported at the after end thereof upon ground wheels and at the forward end thereof on the fifth wheel of a towing vehicle, means providing communication between the bottom portions of said tanks for equalizing liquid levels therein and means providing communication between said tanks above the liquid level therein for equalizing the vapor pressure.

VICTOR C. NORQUIST.
RALPH A. BRADLEY.